United States Patent
Kobayashi et al.

(10) Patent No.: US 8,231,129 B2
(45) Date of Patent: Jul. 31, 2012

(54) SEALING DEVICE

(75) Inventors: Naoto Kobayashi, Fukushima (JP); Go Kanzaki, Fukushima (JP)

(73) Assignee: NOK Corporation (JP)

( * ) Notice: Subject to any disclaimer, the term of this patent is extended or adjusted under 35 U.S.C. 154(b) by 341 days.

(21) Appl. No.: 12/595,189

(22) PCT Filed: Feb. 27, 2008

(86) PCT No.: PCT/JP2008/053355
§ 371 (c)(1),
(2), (4) Date: Oct. 8, 2009

(87) PCT Pub. No.: WO2008/126487
PCT Pub. Date: Oct. 23, 2008

(65) Prior Publication Data
US 2010/0066029 A1    Mar. 18, 2010

(30) Foreign Application Priority Data

Apr. 10, 2007 (JP) ................. 2007-102373
Apr. 20, 2007 (JP) ................. 2007-111633

(51) Int. Cl.
*F16J 15/02* (2006.01)
(52) U.S. Cl. .......... 277/346; 277/551; 277/562
(58) Field of Classification Search .......... 277/346, 277/353, 549, 551, 562
See application file for complete search history.

(56) References Cited

U.S. PATENT DOCUMENTS

| | | | | |
|---|---|---|---|---|
| 4,252,329 A * | 2/1981 | Messenger | ........ | 277/551 |
| 5,803,617 A * | 9/1998 | Ohnuki et al. | ........ | 384/486 |
| 5,813,675 A * | 9/1998 | Otto | ........ | 277/549 |
| 7,674,044 B2 * | 3/2010 | Matsui | ........ | 384/486 |
| 2007/0211974 A1 * | 9/2007 | Toth et al. | ........ | 384/448 |

FOREIGN PATENT DOCUMENTS

| | | |
|---|---|---|
| JP | H01-154368 U | 10/1989 |
| JP | H04-64664 U | 6/1992 |
| JP | 09-287619 A | 11/1997 |
| JP | 2004-084796 A | 3/2004 |
| JP | 2004-278619 A | 10/2004 |
| JP | 2005-351392 A | 12/2005 |
| WO | WO 2005121614 A1 * | 12/2005 |

* cited by examiner

*Primary Examiner* — Vishal Patel

(74) *Attorney, Agent, or Firm* — Harness, Dickey & Pierce, P.L.C.

(57) ABSTRACT

To avoid interference of a side lip when plural sealing devices are piled up, a sealing device installed on one member of two members rotating relatively is constructed by combining a mounting ring fitted on the one member and a rubber-like elastic body attached on the mounting ring, and has a side lip formed by the elastic body, the mounting ring has a cylinder portion at a position fitted on the peripheral surface of the one member, the elastic body has a rubber step part provided at axially one side of the cylinder portion, the cylinder portion and the rubber step part have a positional relationship that the former of an upper sealing device is placed on the latter of the one sealing device when piled up, and the side lip of the one sealing device is dimensioned not to interfere with the upper sealing device even when they are in such a positional relationship.

8 Claims, 5 Drawing Sheets

://

SEALING DEVICE

CROSS-REFERENCE TO RELATED APPLICATIONS

This is a national phase of the International Application No. PCT/JP2008/053355 filed on Feb. 27, 2008 and published in Japanese language.

BACKGROUND OF THE INVENTION

1. Field of the Invention

The present invention relates to a sealing device in accordance with a sealing technique. The sealing device in accordance with the present invention is used, for example, as a hub bearing seal in an automotive associated field, or is used in each of associated fields of an electrical appliance, an industrial machine, a bicycle and the like.

2. Description of the Conventional Art

Conventionally, there has been known a sealing device 51 shown in FIG. 6, and the sealing device 51 is used as a hub bearing seal in a bearing portion of a wheel suspension apparatus for a motor vehicle, and is constructed by a combination of a mounting ring 52 which is fitted to a bearing outer ring 61 and is made of a rigid material such as a metal or the like, and a rubber-like elastic body 53 which is attached to the mounting ring 52, and a side lip 54 which slidably comes into close contact with an end surface in an axial direction (including a curved surface portion having a circular arc cross sectional shape and being formed in an inner peripheral portion of the end surface in the axial direction. The same is applied hereinafter too.) 62a of a hub 62 corresponding to a bearing inner ring is formed by the rubber-like elastic body 53 (refer to Japanese Unexamined Patent Publication No. 9-287619 and Japanese Unexamined Patent Publication No. 2005-351392).

The sealing device 51 is used as the hub bearing seal as mentioned above, and seals it in such a manner as to prevent foreign materials such as muddy water, dust and the like in an outer portion of the bearing from making an intrusion into an inner portion of the bearing, however, there occurs a case that the side lip 54 in one sealing device 51 is interfered with the mounting ring 52 in an upper sealing device 51 at a time of coaxially piling up a plurality of sealing devices 51 at a time of product shipping or the like, whereby there is a disadvantage that an adhesion phenomenon is caused, a lubricating grease previously applied to the side lip 54 is scraped off, or the like. In this case, in order to prevent the slide lips 54 from being interfered with each other at a time of piling, it is preferable to set a length in an axial direction of an outer peripheral tubular portion 52a in the mounting ring 52 large, however, since an attaching space s in the bearing outer ring 61 is actually limited, it is impossible to set the length in the axial direction so large as to prevent the interference.

SUMMARY OF THE INVENTION

Problem to be Solved by the Invention

The present invention is made by taking the points mentioned above into consideration, and an object of the present invention is to provide a sealing device which can effectively inhibit side lips from being interfered with each other at a time of piling a plurality of sealing devices each having the side lip.

Means for Solving the Problem

In order to achieve the object mentioned above, in accordance with a first aspect of the present invention, there is provided a sealing device installed to one member of two relatively rotating members and slidably coming into close contact with the other member, the sealing device comprising a combination of a mounting ring fitted to the one member and made of a rigid material such as a metal or the like, and a rubber-like elastic body attached to the mounting ring, a side lip being formed by the rubber-like elastic body to slidably comes into close contact with the other member, wherein the mounting ring has a cylinder portion at a position fitted to a peripheral surface of the one member, the rubber-like elastic body has a rubber step part arranged at one side in an axial direction of the cylinder portion, the cylinder portion and the rubber step part have such a positional relationship that the cylinder portion in an upper sealing device is mounted on the rubber step part in one sealing device at a time of piling a plurality of sealing devices, and an end surface in the axial direction of the rubber step part is provided with a radial direction positioning portion constructed by a convex portion or a concave portion for positioning the sealing devices in the radial direction at a time of piling a plurality of sealing devices.

Further, in accordance with a second aspect of the present invention, there is provided a sealing device as recited in the first aspect mentioned above, wherein the cylinder portion in the mounting ring integrally has a tubular portion fitted to a peripheral surface of the one member, a reverse portion provided from an end portion at the other side in the axial direction of the tubular portion toward an inner side in a radial direction, and a second tubular portion provided from an inner peripheral end portion of the reverse portion toward one side in the axial direction, an inward flange portion is integrally formed from an end portion at one side in the axial direction of the second tubular portion toward the inner side in the radial direction, a rubber step part is arranged at one side in the axial direction of the cylinder portion, and the side lip is arranged at one side in the axial direction of the inward flange portion.

Further, in accordance with a fourth aspect of the present invention, there is provided a sealing device as recited in the second aspect mentioned above, wherein an outward flange portion is integrally formed from an end portion at one side in the axial direction of the tubular portion in the cylinder portion of the mounting ring toward an outer side in the radial direction, the outward flange portion is struck against the end surface in the axial direction of one member at a time of being installed, and a rubber step part is arranged at one side in the axial direction of the cylinder portion and the outward flange portion.

Further, in accordance with a fifth aspect of the present invention, there is provided a sealing device as recited in the fourth aspect mentioned above, wherein an outer peripheral side side lip slidably coming into close contact with the other member is integrally formed in an outer peripheral end portion of the rubber step part or in the vicinity thereof.

Further, in accordance with a sixth aspect of the present invention, there is provided a sealing device as recited in the fourth aspect mentioned above, wherein the rubber step part is arranged close to the end surface in the axial direction of the other member at a time of being installed, and a labyrinth seal is set between both.

Further, in accordance with a seventh aspect of the present invention, there is provided a sealing device as recited in the fourth aspect mentioned above, wherein the radial direction positioning portion provided on the end surface in the axial direction of the rubber step part is constructed by a convex portion, the radial direction positioning portion is arranged close to the end surface in the axial direction of the other member at a time of being installed, and a labyrinth seal is set between both.

Further, in accordance with an eighth aspect of the present invention, there is provided a sealing device installed to one member of two relatively rotating members and slidably coming into close contact with the other member, the sealing device comprising a combination of a mounting ring fitted to the one member and made of a rigid material such as a metal or the like, and a rubber-like elastic body attached to the mounting ring, a side lip being formed by the rubber-like elastic body to slidably comes into close contact with the other member, wherein the mounting ring integrally has a tubular portion fitted to a peripheral surface of the one member, and an inward flange portion provided from an end portion at one side in an axial direction of the tubular portion toward an inner side in a radial direction, the rubber-like elastic body has an end surface rubber portion attached to an end surface at one side in the axial direction of the mounting ring, the mounting ring and the rubber-like elastic body have such a positional relationship that an end portion at the other side in the axial direction of the tubular portion in an upper sealing device is mounted on the end surface rubber portion in one sealing device at a time of piling a plurality of sealing devices, the side lip in the one sealing device has such a dimensional relationship that it is not interfered with the upper sealing device, and an end surface in the axial direction of the end surface rubber portion is provided with a radial direction positioning portion constructed by a convex portion or a concave portion for positioning the sealing devices in the radial direction at a time of piling a plurality of sealing devices.

Effect of the Invention

In the sealing device in accordance with the first aspect of the present invention provided with the structure mentioned above, the rubber step part is provided in the rubber-like elastic body as well as the cylinder portion is provided in the mounting ring, both have such a positional relationship that the cylinder portion in an upper sealing device is mounted on the rubber step part in the one sealing device at a time of piling a plurality of sealing devices, and the side lip in the one sealing device has such a dimensional relationship that it is not interfered with the upper sealing device at this time. Accordingly, since the cylinder portion in the upper sealing device is mounted on the rubber step part in the one sealing device at a time of piling a plurality of sealing devices, and the side lip in one sealing device is not interfered with the upper sealing device at this time, it is possible to previously suppress the interference of the side lips.

As the shape of the mounting ring, preferably, the cylinder portion is formed by the tubular portion fitted to the peripheral surface of the one member, the reverse portion provided from the end portion at the other side in the axial direction of the tubular portion toward the inner side in the radial direction, and the second tubular portion provided from the inner peripheral end portion of the reverse portion toward one side in the axial direction, the inward flange portion is integrally formed from the end portion at one side in the axial direction of the second tubular portion toward the inner side in the radial direction, the rubber step part is arranged at one side in the axial direction of the cylinder portion, and the side lip is arranged at one side in the axial direction of the inward flange portion. In accordance with this structure, since the cylinder portion has the double inside and outside tubular portions, it has a large width in the radial direction. Further, since the rubber step part arranged at the one side in the axial direction of the cylinder portion becomes large in the width in the radial direction, it is possible to stabilize a piling attitude in which the cylinder portion is mounted on the rubber step part. Further, in this shape, the reverse portion in the cylinder portion is mounted on the rubber step part, however, the inward flange portion is arranged at a position which is moved backward to one side in the axial direction at the length in the axial direction of the second tubular portion, with respect to the reverse portion. Accordingly, since a comparatively large space is set at the other side in the axial direction of the inward flange portion, that is, at the inner peripheral side of the second tubular portion at the lower side of the inward flange portion in the piled state, it is possible to effectively suppress the interference of the side lip by accommodating the side lip of a lower sealing device in the space.

Further, in the present invention, the end surface in the axial direction of the rubber step part is provided with the radial direction positioning portion constructed by the convex portion or the concave portion for positioning the sealing devices in the radial direction at a time of piling a plurality of sealing devices, and the cylinder portion is engaged with the positioning portion, whereby the sealing devices are positioned in the radial direction. Accordingly, it is possible to suppress a displacement between the sealing devices, and it is possible to stabilize the piling attitude from this regard.

Further, in the present invention, the outward flange portion is integrally formed from the end portion at one side in the axial direction of the tubular portion in the cylinder portion of the mounting ring toward the outer side in the radial direction, the outward flange portion is struck against the end surface in the axial direction of the one member at a time of being installed, and the rubber step part is arranged at the one side in the axial direction of the cylinder portion and the outward flange portion. Accordingly, it is possible to accurately position the sealing device with respect to the one member in the axial direction by striking the outward flange portion against the end surface in the axial direction of the one member at a time of installing the sealing device, whereby it is possible to stabilize a fastening margin of the side lip. Further, since the length in the axial direction of the sealing device is enlarged at the thickness of the outward flange portion and the rubber step part which is arranged in the one side in the axial direction thereof, it is possible to pile the sealing devices in a state in which the side lips are not interfered, even in the case of a specification that an attaching space is narrow.

Further, in the present invention, since the outer peripheral side side lip slidably coming into close contact with the other member is integrally formed in the outer peripheral end portion of the rubber step part or in the vicinity thereof, it is possible to improve a sealing performance by the outer peripheral side side lip.

Further, in the present invention, since the rubber step part is arranged close to the end surface in the axial direction of the other member at a time of being installed, and the labyrinth seal is set between both, it is also possible to improve the sealing performance.

Further, in the present invention, since the radial direction positioning portion constructed by the convex portion provided in the end surface in the axial direction of the rubber step part is arranged close to the end surface in the axial direction of the other member at a time of being installed, and the labyrinth seal is set between both, it is also possible to improve the sealing performance.

In the sealing device in accordance with the eighth aspect of the present invention provided with the structure mentioned above, the mounting ring is integrally provided with the tubular portion and the inward flange portion, the end surface rubber portion is provided in the rubber-like elastic body, and the mounting ring and the rubber-like elastic body have such the positional relationship that the end portion at the other side in the axial direction of the tubular portion in an upper sealing device is mounted on the end surface rubber portion in the one sealing device at a time of piling a plurality of sealing devices, and have such the dimensional relationship that the side lip in the one sealing device is not interfered with the upper sealing device at this time. Accordingly, since the end portion at the other side in the axial direction of the tubular portion in the upper sealing device is mounted on the end surface rubber portion in the one sealing device at a time of piling a plurality of sealing devices, and the side lip in the one sealing device is not interfered with the upper sealing device at this time, it is possible to previously suppress the interference of the side lip.

Further, in the present invention, the end surface in the axial direction of the end surface rubber portion is provided with the radial direction positioning portion constructed by the convex portion or the concave portion for positioning the sealing devices in the radial direction at a time of piling a plurality of sealing devices, and the end portion at the other side in the axial direction of the tubular portion is engaged with the positioning portion, whereby the sealing devices are positioned with each other in the radial direction. Accordingly, it is possible to suppress the displacement between the sealing devices, and it is possible to stabilize the piling attitude.

DETAILED DESCRIPTION OF PREFERRED EMBODIMENT

Next, a description will be given of embodiments in accordance with the present invention with reference to the accompanying drawings.

First Embodiment

Figure 1:
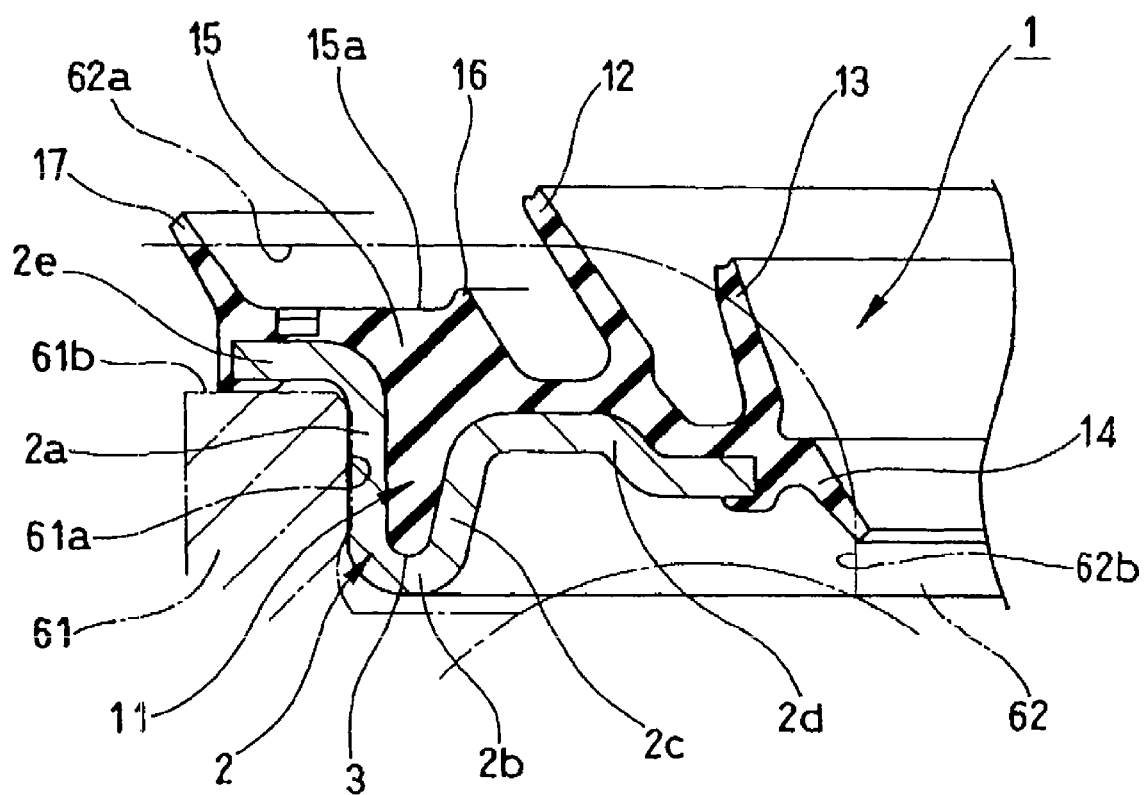
FIG. 1 is a sectional view of a substantial part of a sealing device in accordance with a first embodiment of the present invention.

FIG. 1 shows a section of a substantial part of a sealing device 1 in accordance with a first embodiment of the present invention. The sealing device 1 in accordance with the embodiment is used as a hub bearing seal in a bearing portion of a wheel suspension apparatus for a motor vehicle, and is structured as follows.

First of all, the sealing device 1 is constructed by a combination of a mounting ring 2 which is fitted to a bearing outer ring 61 and is made of a rigid material such as a metal or the like and a rubber-like elastic body 11 which is attached (vulcanization bonded) to the mounting ring 2, and a side lip (a first side lip) 12, a side lip (a second side lip) 13 and a radial lip (a grease lip) 14 are integrally formed by the latter rubber-like elastic body 11. The side lip 12 slidably comes into close contact with an end surface 62a in an axial direction of a hub 62 corresponding to a bearing inner ring, the side lip 13 is arranged at an inner peripheral side thereof and slidably comes into close contact with the end surface 62a in the axial direction of the hub 62 in the same manner, and the radial lip 14 slidably comes into close contact with an outer peripheral surface 62b of the hub 62.

Figure 2:
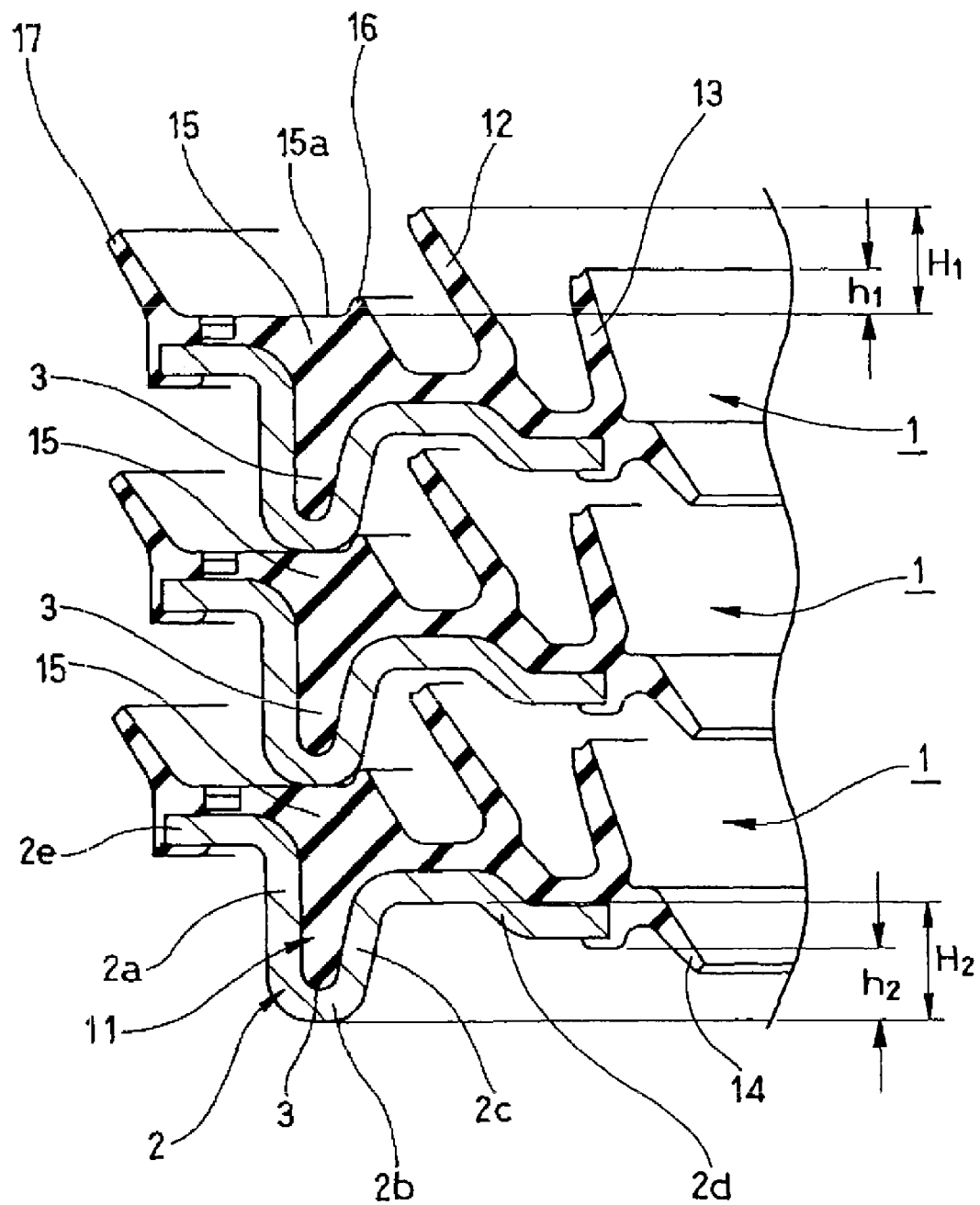
FIG. 2 is a sectional view showing a state in which a plurality of sealing devices are piled.

The mounting ring 2 is provided with a cylinder portion 3 which is arranged at a position fitted to an inner peripheral surface 61a of the bearing outer ring 61, the rubber-like elastic body 11 is provided with an annular rubber step part 15 which is arranged so as to be positioned at one side (an upper side in the drawing) in an axial direction of the cylinder portion 3, the cylinder portion 3 and the rubber step part 15 are set in such a positional relationship that the cylinder portion 3 in an upper sealing device 1 is mounted on the rubber step part 15 in one sealing device 1 at a time of coaxially piling a plurality of sealing devices 1 as shown in FIG. 2, and the side lips 12 and 13 in the one sealing device 1 are set in such a dimensional relationship that they are not interfered with the upper sealing device 1 at this time.

The cylinder portion 3 of the mounting ring 2 integrally has a tubular portion 2a which is fitted to the inner peripheral surface 61a of the bearing outer ring 61, a reverse portion 2b which is provided from an end portion at the other side (a lower side in the drawing) in an axial direction of the tubular portion 2a toward an inner side in a radial direction and is formed in a circular arc sectional shape, and a second tubular portion 2c which is provided from an inner peripheral end portion of the reverse portion 2b toward one side in an axial direction, an inward flange portion 2d is integrally formed on an end portion at one side in the axial direction of the second tubular portion 2c so as to be directed to an inner side in a radial direction, the rubber step part 15 is arranged at one side in the axial direction of the cylinder portion 3 which is constructed by the tubular portion 2a, the reverse portion 2b and the second tubular portion 2c, and the side lips 12 and 13 are arranged at the one side in the axial direction of the inward flange portion 2d.

The rubber step part 15 has an end surface 15a in an axial direction which is opposed to the end surface 62a in the axial direction of the hub 62 in the axial direction at a time of installing and is formed in an axially rectangular flat shape, and the cylinder portion 3 of the upper sealing device 1 is mounted on the end surface 15a in the axial direction as shown in FIG. 2. The end surface 15a in the axial direction is arranged at a position at one side in the axial direction from the mounting ring 2.

Further, the end surface 15a in the axial direction of the rubber step part 15 is provided with a radial direction positioning portion 16 constructed by a convex portion or a concave portion for positioning the sealing devices 1 with each other in a radial direction at a time of piling a plurality of sealing devises 1, the radial direction positioning portion 16 is constructed by an annular convex portion provided on an inner peripheral end portion of the end surface 15a in the axial direction in the drawing, and a diameter thereof is set such a magnitude that it comes into contact with an end inner peripheral portion of the cylinder portion 3 (an inner peripheral portion of the reverse portion 2b). In this case, an arrangement thereof may be set to a position coming into contact with an end outer peripheral portion of the cylinder portion 3 (an outer peripheral portion of the reverse portion 2b). Further, the convex portion is not necessarily formed in the annular shape, but may be structured such that a plurality of convex portions are lined up on a circumference at fixed intervals. In the case of the concave portion, it is formed in an annular shape, and the end portion (the reverse portion 2b) of the cylinder portion 3 is fitted to the annular concave portion.

Further, an outward flange portion 2e is integrally formed on an end portion at one side in the axial direction of the tubular portion 2a in the cylinder portion 3 of the mounting ring 2 so as to be directed to an outer side in the radial direction, and the outward flange portion 2e is struck against the end surface 61b in the axial direction of the bearing outer ring 61 at a time of being installed. Further, the rubber step part 15 is provided so as to extend outward in the radial direction to a position where it covers the outward flange portion 2e, and an outer peripheral side side lip 17 slidably coming into close contact with the end surface 62a in the axial direction of the hub 62 is integrally formed as a third side lip on an outer peripheral end portion of the extended rubber step part 15.

In this case, with regard to the interference prevention mentioned above, a dimensional relationship of the respective portions is set as follows.

As shown in FIG. 2, setting a height in an axial direction of the first side lip 12 from the rubber step part end surface 15a to H1, setting a height in an axial direction of the second side lip 13 from the rubber step part end surface 15a to h1, setting a width in an axial direction (a backward moving width in the axial direction) from an end portion (an end of the reverse portion 2b) of the mounting ring 2 at the same dimensional position in the radial direction as the end of the first side lip 12 to the inward flange portion 2d (the rubber-like elastic body 11 in the case that the rubber-like elastic body 11 is attached to the end surface at the other side in the axial direction of the inward flange portion 2d) to H2, and setting a width in an axial direction (a backward moving width in the axial direction) from an end portion (an end of the reverse portion 2b) of the mounting ring 2 at the same dimensional position in the radial direction as the end of the second side lip 13 to the inward flange portion 2d (the rubber-like elastic body 11 in the case that the rubber-like elastic body 11 is attached to the end surface at the other side in the axial direction of the inward flange portion 2d) to h2, the following relationships are satisfied.

$H1 < H2$ $h1 < h2$

The sealing device 1 having the structure mentioned above is used as the hub bearing seal as mentioned above, and is structured such as to seal it to prevent foreign materials such as muddy water, dust or the like in an outer portion of the bearing from making an intrusion into an internal portion of the bearing, and is characterized by a point that the following operations and effects can be achieved by the structure mentioned above.

First of all, in the sealing device 1, the cylinder portion 3 is provided in the mounting ring 2, the rubber step part 15 is provided in the rubber-like elastic body 11, the cylinder portion 3 and the rubber step part 15 are set to have such the positional relationship that the cylinder portion 3 in an upper sealing device 1 is mounted on the rubber step part 15 in one sealing device 1 at a time of coaxially piling a plurality of sealing devices 1, and the side lips 12 and 13 in one sealing device 1 are set to have such the dimensional relationship that they are not interfered with the upper sealing device 1 at this time. Accordingly, since the cylinder portion 3 in the upper sealing device 1 is mounted on the rubber step part 15 in the one sealing device 1 at a time of coaxially piling a plurality of sealing devices 1, and the side lips 12 and 13 in the one sealing device 1 are not interfered with the upper sealing device 1 at this time, it is possible to previously suppress the interference of the side lips 12 and 13.

Further, as the shape of the mounting ring 2, the cylinder portion 3 is structured such as to integrally have the tubular portion 2a which is fitted to the inner peripheral surface 61a of the bearing outer ring 61, the reverse portion 2b which is provided from the end portion at the other side in the axial direction of the tubular portion 2a toward the inner side in the radial direction and is formed in the circular arc sectional shape, and the second tubular portion 2c which is provided from the inner peripheral end portion of the reverse portion 2b toward the one side in the axial direction, and the rubber step part 15 is arranged in one side in the axial direction of the cylinder portion 3. Accordingly, since both the cylinder portion 3 and the rubber step part 15 are set to have large widths in the radial direction, it is possible to stabilize the piling up attitude in which the cylinder portion 3 is mounted on the rubber step part 15. Further, in this shape, the reverse portion 2b in the cylinder portion 3 is mounted on the rubber step part 15, however, the inward flange portion 2d is arranged at a position which is moved backward to one side in the axial direction at a length in the axial direction of the second cylinder portion 2c with respect to the reverse portion 2b. Accordingly, since a comparatively large space is set in the other side in the axial direction of the inward flange portion 2d, that is, in the inner peripheral side of the second tubular portion 2c in the lower side of the inward flange portion 2d in the piled state, it is possible to effectively suppress the interference of the side lips 12 and 13 by setting a dimension in such a manner as to accommodate the side lips 12 and 13 of a lower sealing device 1 in this space.

Further, the end surface 15a of the rubber step part 15 is provided with the radial direction positioning portion 16 constructed by the convex portion or the concave portion for positioning the sealing devices 1 with each other in the radial direction at a time of piling a plurality of sealing devices 1, and the cylinder portion 3 is engaged with the radial direction positioning portion 16, thereby structuring such that the sealing devices 1 are positioned with each other in the radial direction. Accordingly, it is possible to suppress the displacement between the sealing devices 1, and it is possible to stabilize the piling attitude from this regard.

Further, since the outward flange portion 2e is integrally formed on the end portion at the one side in the axial direction of the tubular portion 2a in the cylinder portion 3 of the mounting ring 2 so as to be directed to the outer side in the radial direction, and the outward flange portion 2e is structured such as to be struck against the end surface 61b in the axial direction of the bearing outer ring 61 at a time of being installed, it is possible to accurately position the sealing device 1 in the axial direction with respect to the bearing outer ring 61 by striking the outward flange portion 2e against the end surface 61b in the axial direction of the bearing outer ring 61 at a time of installing the sealing device 1, whereby it is possible to stabilize the fastening margin of the side lips 12 and 13. Further, since the length in the axial direction of the whole of the sealing device 1 is enlarged at the thickness of the outward flange portion 2e and the thickness of the rubber step part 15 arranged at one side in the axial direction thereof, it is possible to pile the sealing devices 1 in a state in which the side lips 12 and 13 are not interfered, even in the case of a specification that an attaching space is narrow.

Further, since the outer peripheral side side lip 17 slidably coming into close contact with the end surface 62*a* in the axial direction of the hub 62 is integrally formed as the third side lip on the outer peripheral end portion of the rubber step part 15, it is possible to improve the sealing performance.

Figure 3:
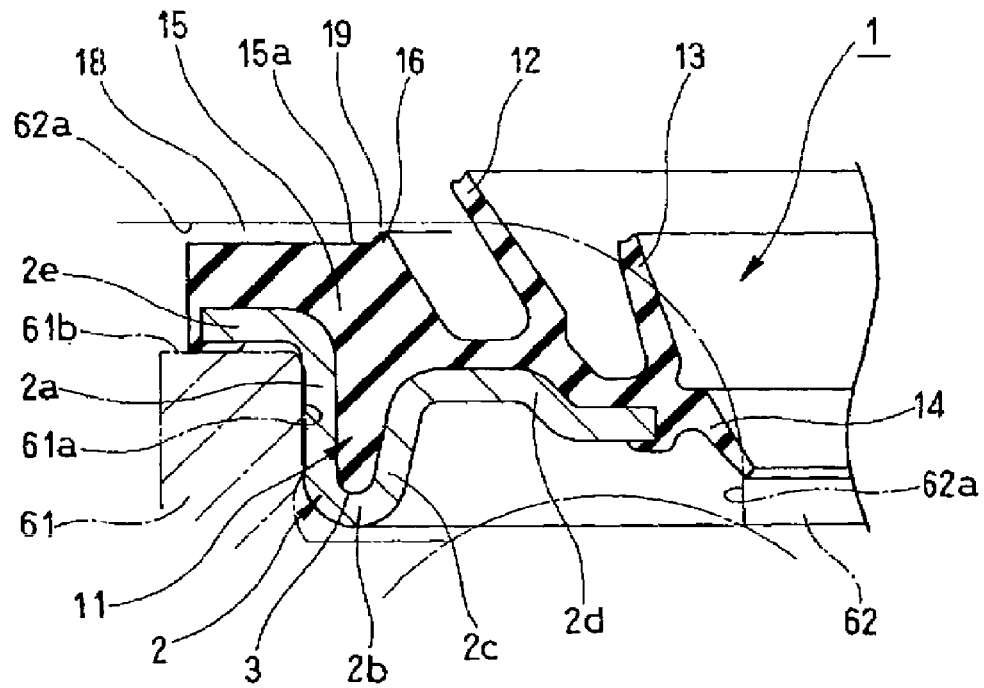
FIG. 3 is a sectional view of a substantial part of a sealing device in accordance with a second embodiment of the present invention.

Next, a description will be given of a second embodiment in accordance with the present invention with reference to FIG. 3.

Second Embodiment

In the embodiment, in place of the outer peripheral side side lip 17 in the first embodiment mentioned above, the end surface 15*a* in an axial direction of the rubber step part 15 is arranged close to the end surface 62*a* in the axial direction of the hub 62 at a time of being installed, and the labyrinth seal 18 is set between both. Further, since the radial direction positioning portion 16 having the convex shape is provided on the end surface 15*a* in the axial direction of the rubber step part 15, a labyrinth seal 19 having a narrower gap than the labyrinth seal 18 is set between the radial direction positioning portion 16 and the end surface 62*a* in the axial direction of the hub 62. Accordingly, it is possible to improve the sealing performance of this portion by setting these labyrinth seals 18 and 19. Since the other structures and operational effects are the same as those of the first embodiment, a description will be omitted by attaching the same reference numerals.

Third Embodiment

Figure 4:
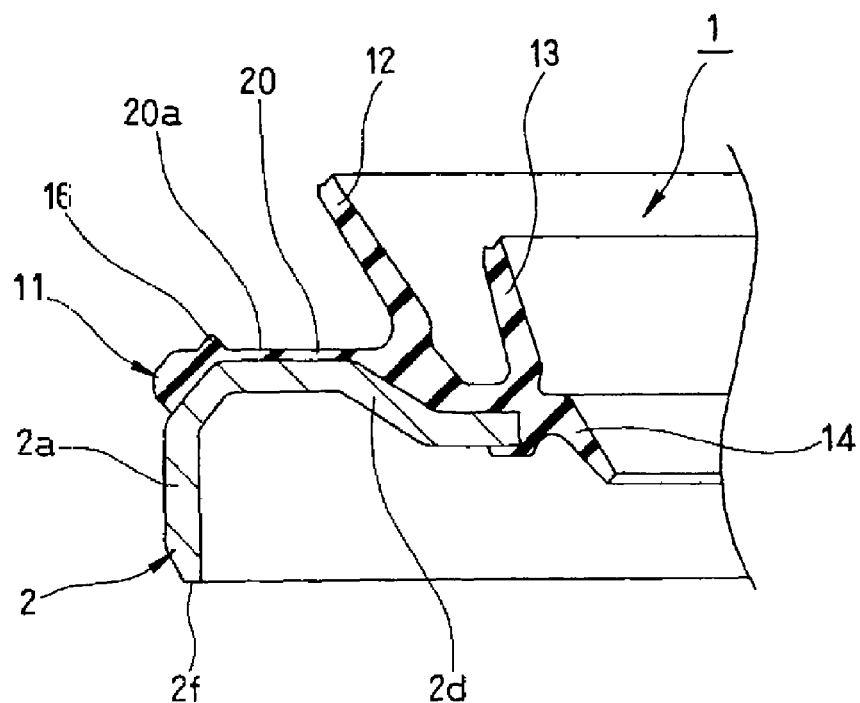
FIG. 4 is a sectional view of a substantial part of a sealing device in accordance with a third embodiment of the present invention.

FIG. 4 shows a section of a substantial part of a sealing device 1 in accordance with a third embodiment of the present invention. The sealing device 1 in accordance with the embodiment is used as a hub bearing seal in a bearing portion of a wheel suspension apparatus for a motor vehicle, and is structured as follows.

First of all, the sealing device 1 is constructed by a combination of a mounting ring 2 which is fitted to a bearing outer ring (not shown, refer to FIG. 1) and is made of a rigid material such as a metal or the like, and a rubber-like elastic body 11 which is attached (vulcanization bonded) to the mounting ring 2, and a side lip (a first side lip) 12, a side lip (a second side lip) 13 and a radial lip (a grease lip) 14 are integrally formed by the latter rubber-like elastic body 11. The side lip 12 slidably comes into close contact with an end surface in an axial direction of a hub (not shown, refer to FIG. 1) corresponding to a bearing inner ring, the side lip 13 is arranged at an inner peripheral side thereof and slidably comes into close contact with the end surface in the axial direction of the hub in the same manner, and the radial lip 14 slidably comes into close contact with an outer peripheral surface of the hub.

Figure 5:
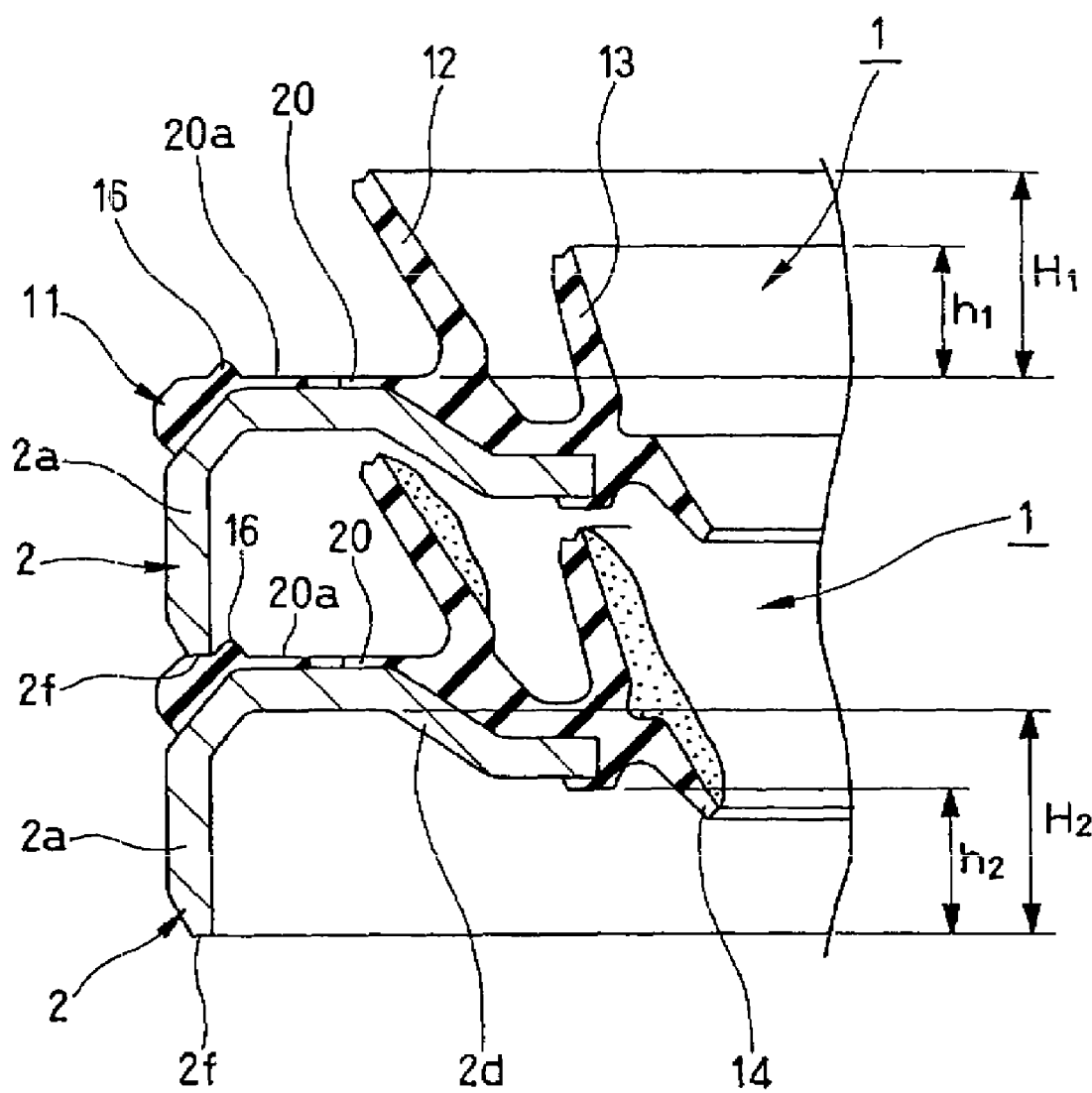
FIG. 5 is a sectional view showing a state in which a plurality of sealing devices are piled.
Figure 6:
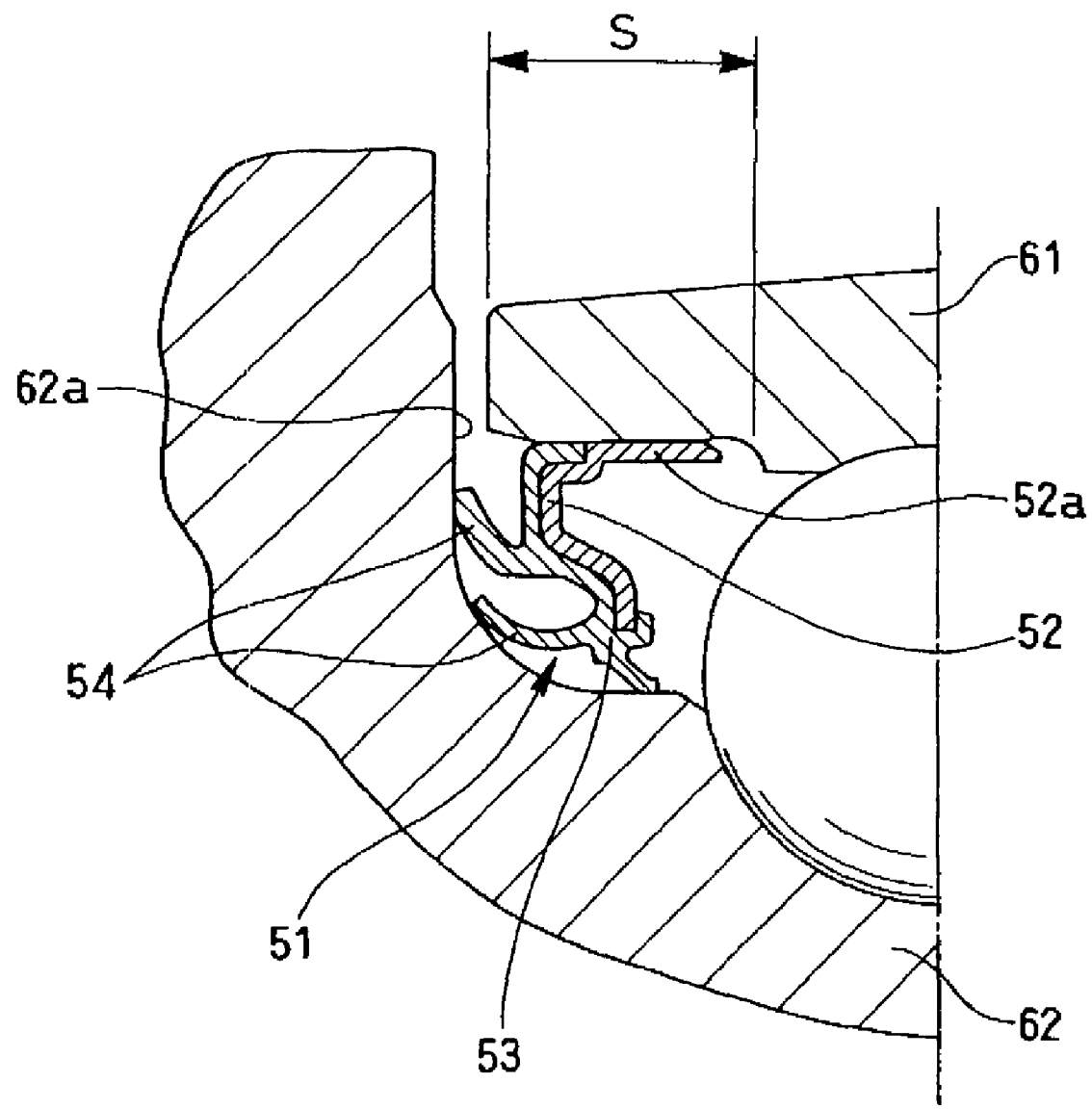
FIG. 6 is a sectional view of a substantial part showing an installed state of a sealing device in accordance with a conventional art.

The mounting ring 2 is structured such that an inward flange portion 2*d* is integrally formed toward the inner side in the radial direction on an end portion at one side (an upper side in the drawing) in an axial direction of a tubular portion 2*a* fitted to an inner peripheral surface of the bearing outer ring, the rubber-like elastic body 11 has an end surface rubber portion 20 which is positioned at an outer peripheral side of the side lip 12 and is attached to an end surface at one side in the axial direction of the mounting ring 2, and the mounting ring 2 and the rubber-like elastic body 11 are set in such a positional relationship that an end portion 2*f* at the other side in the axial direction of the tubular portion 2*a* of the mounting ring 2 in an upper sealing device 1 is mounted on the end surface rubber portion 20 in one sealing device 1 at a time of coaxially piling a plurality of sealing devices 1 as shown in FIG. 5, and the side lips 12 and 13 in the one sealing device 1 are set in such a dimensional relationship that they are not interfered with the upper sealing device 1 at this time.

The end surface rubber portion 20 has an end surface 20*a* in an axial direction which is opposed to the end surface in the axial direction of the hub in the axial direction at a time of being installed and is formed in an axially rectangular flat shape, and the tubular portion 2*a* of the mounting ring 2 in the upper sealing device 1 is mounted on the end surface 20*a* in the axial direction as shown in FIG. 5. The end surface 20*a* in the axial direction is arranged at a position at one side in the axial direction from the mounting ring 2.

Further, the end surface 20*a* in the axial direction of the end surface rubber portion 20 is provided with a radial direction positioning portion 16 constructed by a convex portion or a concave portion for positioning the sealing devices 1 with each other in a radial direction at a time of piling a plurality of sealing devises 1, the radial direction positioning portion 16 is constructed by an annular convex portion provided close to an outer peripheral edge of the end surface 20*a* in the axial direction in the figure, and a diameter thereof is set such a magnitude that it comes into contact with the end portion 2*f* at the other side in the axial direction of the tubular portion 2*a* of the mounting ring 2. The convex portion is not necessarily formed in the annular shape, but may be structured such that a plurality of convex portions are lined up on a circumference at fixed intervals. In the case of the concave portion, it is formed in an annular shape, and the end portion 2*f* at the other side in the axial direction of the tubular portion 2*a* of the mounting ring 2 is fitted to the annular concave portion.

In this case, with regard to the interference prevention mentioned above, a dimensional relationship of the respective portions is set as follows.

As shown in FIG. 5, setting a height in an axial direction of the first side lip 12 from the end surface rubber portion end surface 20*a* to H1, setting a height in an axial direction of the second side lip 13 from the end surface rubber portion end surface 20*a* to h1, setting a width in an axial direction (a backward moving width in the axial direction) from the end portion 2*f* at the other side in the axial direction of the tubular portion 2*a* of the mounting ring 2 at the same dimensional position in the radial direction as the end of the first side lip 12 to the inward flange portion 2*d* (the rubber-like elastic body 11 in the case that the rubber-like elastic body 11 is attached to the end surface at the other side in the axial direction of the inward flange portion 2*d*) to H2, and setting a width in an axial direction (a backward moving width in the axial direction) from the end portion 2*f* at the other side in the axial direction of the tubular portion 2*a* of the mounting ring 2 at the same dimensional position in the radial direction as the end of the second side lip 13 to the inward flange portion 2*d* (the rubber-like elastic body 11 in the case that the rubber-like elastic body 11 is attached to the end surface at the other side in the axial direction of the inward flange portion 2*d*) to h2, the following relationships are satisfied.

$H1 < H2$ $h1 < h2$

The sealing device 1 having the structure mentioned above is used as the hub bearing seal as mentioned above, and is structured such as to seal it so as to prevent foreign materials such as muddy water, dust or the like in an outer portion of the bearing from making an intrusion into an internal portion of the bearing, and is characterized by a point that the following operations and effects can be achieved by the structure mentioned above.

First of all, in the sealing device 1, the tubular portion 2a and the inward flange portion 2d are integrally provided in the mounting ring 2, the end surface rubber portion 20 is provided in the rubber-like elastic body 11, the mounting ring 2 and the rubber-like elastic body 11 are set to have such the positional relationship that the end portion 2f at the other side in the axial direction of the tubular portion 2a in an upper sealing device 1 is mounted on the end surface rubber portion 20 in one sealing device 1 at a time of coaxially piling a plurality of sealing devices 1, and the side lips 12 and 13 in one sealing device 1 are set to have such the dimensional relationship that they are not interfered with the upper sealing device 1 at this time. Accordingly, since the end portion 2f at the other side in the axial direction of the tubular portion 2a in the upper sealing device 1 is mounted on the end surface rubber portion 20 in the one sealing device 1 at a time of coaxially piling a plurality of sealing devices 1, and the side lips 12 and 13 in the one sealing device 1 are not interfered with the upper sealing device 1 at this time, it is possible to previously suppress the interference of the side lips 12 and 13.

Further, the end surface 20a of the end surface rubber portion 20 is provided with the radial direction positioning portion 16 constructed by the convex portion or the concave portion for positioning the sealing devices 1 with each other in the radial direction at a time of piling a plurality of sealing devices 1, and the end portion 2f at the other side in the axial direction of the tubular portion 2a is engaged with the radial direction positioning portion 16, thereby structuring such that the sealing devices 1 are positioned with each other in the radial direction. Accordingly, it is possible to suppress the displacement between the sealing devices 1, and it is possible to stabilize the piling attitude.

What is claimed is:

1. A sealing device adapted to be installed to one of two relatively rotating members and adapted to slidably come into close contact with the other of the two relatively rotating members, the sealing device comprising:
    a mounting ring fittable to said one member and made of a rigid material; and
    an elastomeric body attached to said mounting ring, said elastomeric body including a side lip to slidably come into close contact with said other member,
    wherein said mounting ring includes:
        a cylinder portion including:
            a first tubular portion at a position fittable to a peripheral surface of said one member,
            a reverse portion provided from an end portion in an axial direction of the first tubular portion toward an inner side in a radial direction, and
            a second tubular portion provided from an inner peripheral end portion of the reverse portion toward one side in an axial direction, and
        an inward flange portion provided from an end portion at one side in an axial direction of said second tubular portion toward the inner side in the radial direction,
    said elastomeric body has a rubber step part arranged at one side in the axial direction of said cylinder portion,
    said cylinder portion and said rubber step part are radially aligned,
    said side lip has a first height relative to a plane of a radially extending planar end surface in an axial direction of said rubber step part, said cylinder portion has a second height from a plane of an end portion at another side in the axial direction of said cylinder portion to said inward flange portion, said first height being less than said second height, and
    said end surface in the axial direction of said rubber step part has a radial direction positioning portion, said radial direction positioning portion is an annular convex portion provided on an inner peripheral end portion of the end surface, the annular convex portion protruding in the axial direction relative to the end surface of the rubber step part, and a diameter of an outer peripheral portion of the annular convex portion coincides with an inner peripheral diameter of the reverse portion so that the annular convex portion is adapted to contact a reverse portion of another said sealing device when stacked thereon.

2. The sealing device as claimed in claim 1, wherein:
    said side lip is arranged at one side in the axial direction of said inward flange portion.

3. The sealing device as claimed in claim 2, wherein said sealing device includes an outward flange portion integrally formed from an end portion at one side in the axial direction of said first tubular portion of said cylinder portion of said mounting ring toward an outer side in the radial direction, said outward flange portion is adapted to strike against an end surface in the axial direction of said one member at a time of being installed, and said rubber step part is arranged at one side in the axial direction of said cylinder portion and said outward flange portion.

4. The sealing device as claimed in claim 3, wherein said sealing device includes an outer peripheral side lip adapted to slidably come into close contact with said other member integrally formed at an outer peripheral end portion of said rubber step part or in the vicinity thereof.

5. The sealing device as claimed in claim 3, wherein said rubber step part is arranged close to the end surface in the axial direction of said other member at a time of being installed, and a labyrinth seal is set between both.

6. The sealing device as claimed in claim 3, wherein said radial direction positioning portion is arranged close to the end surface in the axial direction of said other member at a time of being installed, and a labyrinth seal is set between both.

7. The sealing device as claimed in claim 3, wherein the end surface in the axial direction of the rubber step part is arranged close to the end surface in the axial direction of said other member to form a first labyrinth seal therebetween.

8. The sealing device as claimed in claim 7, wherein said radial direction positioning portion having the convex shape is provided on the end surface in the axial direction of the rubber step part to form a second labyrinth seal having a narrower gap than the first labyrinth seal between the radial direction positioning portion and the end surface in the axial direction of the other member.

* * * * *